United States Patent [19]
Bloser et al.

[11] Patent Number: 5,934,696
[45] Date of Patent: Aug. 10, 1999

[54] VARIABLE RATE ANTI-ROLL BAR END LINK

[75] Inventors: Nathan E. Bloser, Goodrich; Quentin A. Lloyd, Redford; Larry G. Martindale, II, Royal Oak, all of Mich.

[73] Assignee: Chrysler Corporation, Auburn Hills, Mich.

[21] Appl. No.: 08/907,677

[22] Filed: Aug. 8, 1997

[51] Int. Cl.$^6$ ...................................................... B60G 7/00
[52] U.S. Cl. ............................ 280/124.106; 280/124.137; 280/124.152; 280/93.51
[58] Field of Search ...................... 280/124.106, 124.13, 280/124.137, 124.149, 124.152, 93.502, 93.507, 93.508, 93.51, 93.511, 124.107; 403/133

[56] References Cited

U.S. PATENT DOCUMENTS

| | | | |
|---|---|---|---|
| 4,462,480 | 7/1984 | Yasui et al. | 180/193 |
| 5,217,245 | 6/1993 | Guy | 280/689 |
| 5,449,193 | 9/1995 | Rivard et al. | 280/689 |
| 5,704,631 | 1/1998 | Sparks et al. | 280/689 |

Primary Examiner—Christopher P. Ellis
Assistant Examiner—Faye M. Fleming
Attorney, Agent, or Firm—William J. Coughlin

[57] ABSTRACT

A link for connecting an anti-roll bar to a control arm of an independent suspension. The link comprises a lower link member, a central link member, and an upper link member. The lower link member comprises a lower portion, a middle portion, and an upper portion, the middle portion comprising a frusto-conical member defining a cylindrical bore which receives a plurality of annular disk springs. The disks are removable and give the link a progressive spring characteristic.

20 Claims, 5 Drawing Sheets

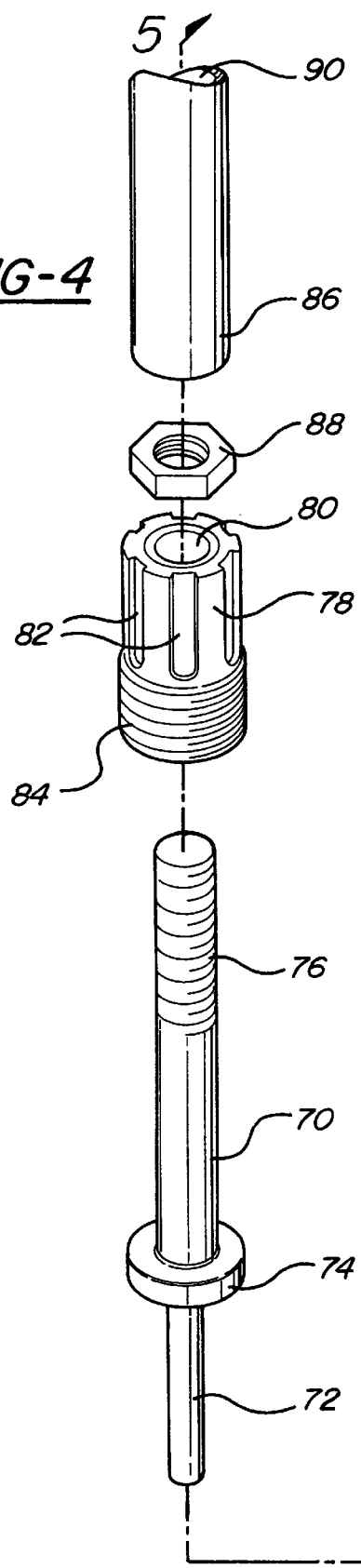
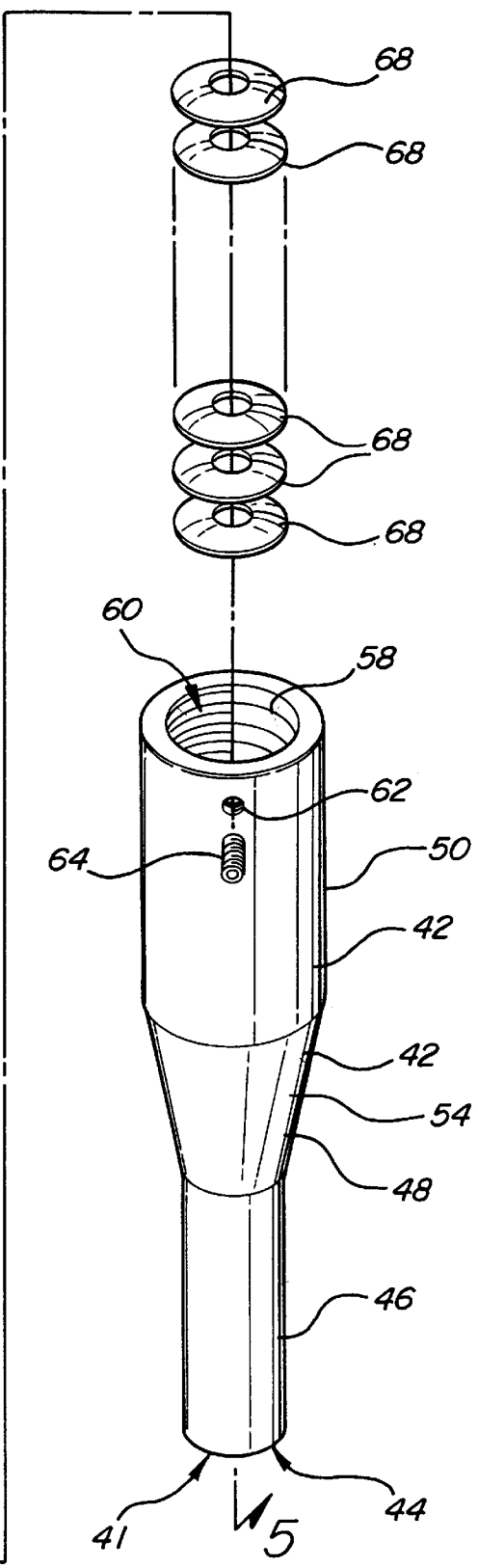
FIG-4

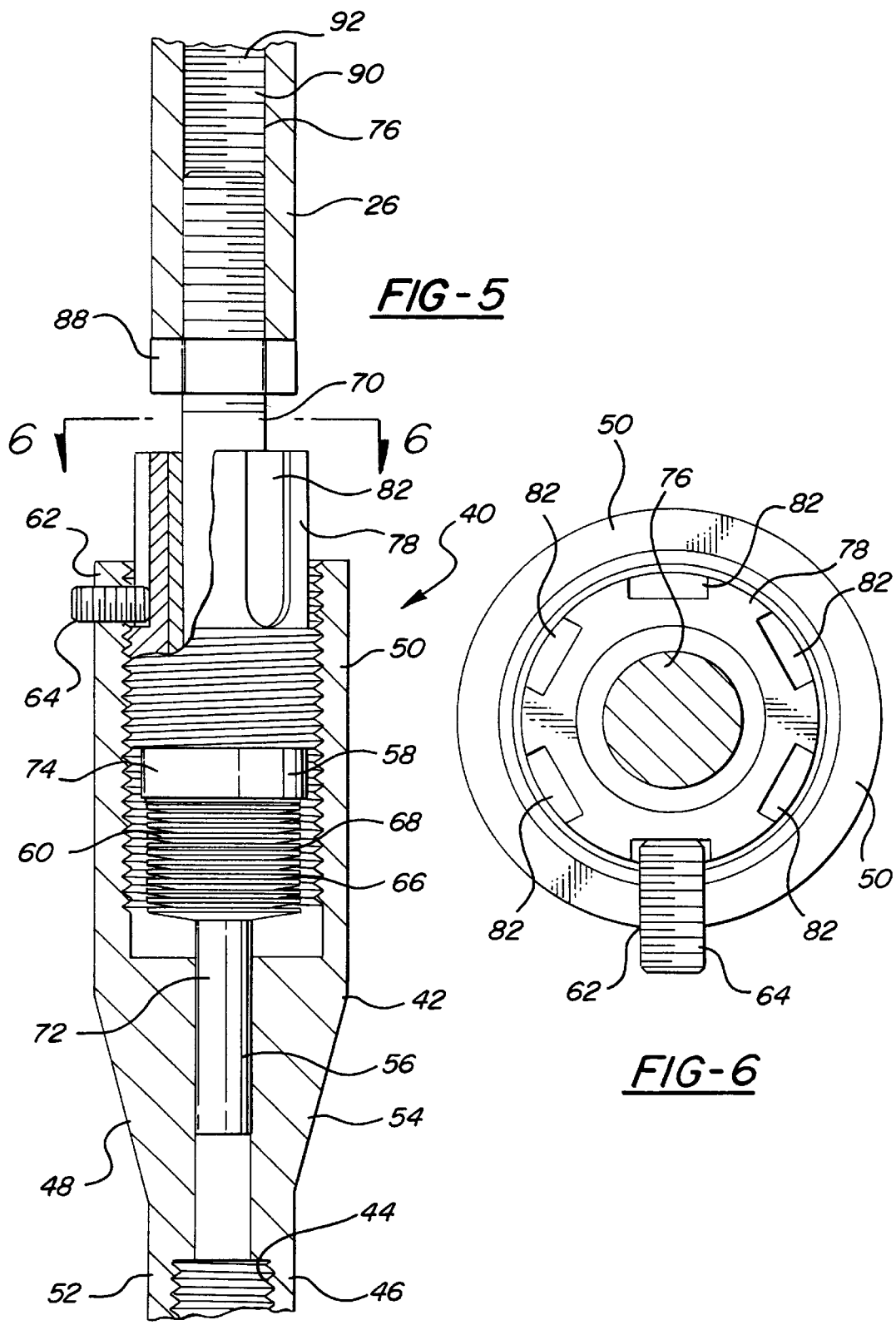

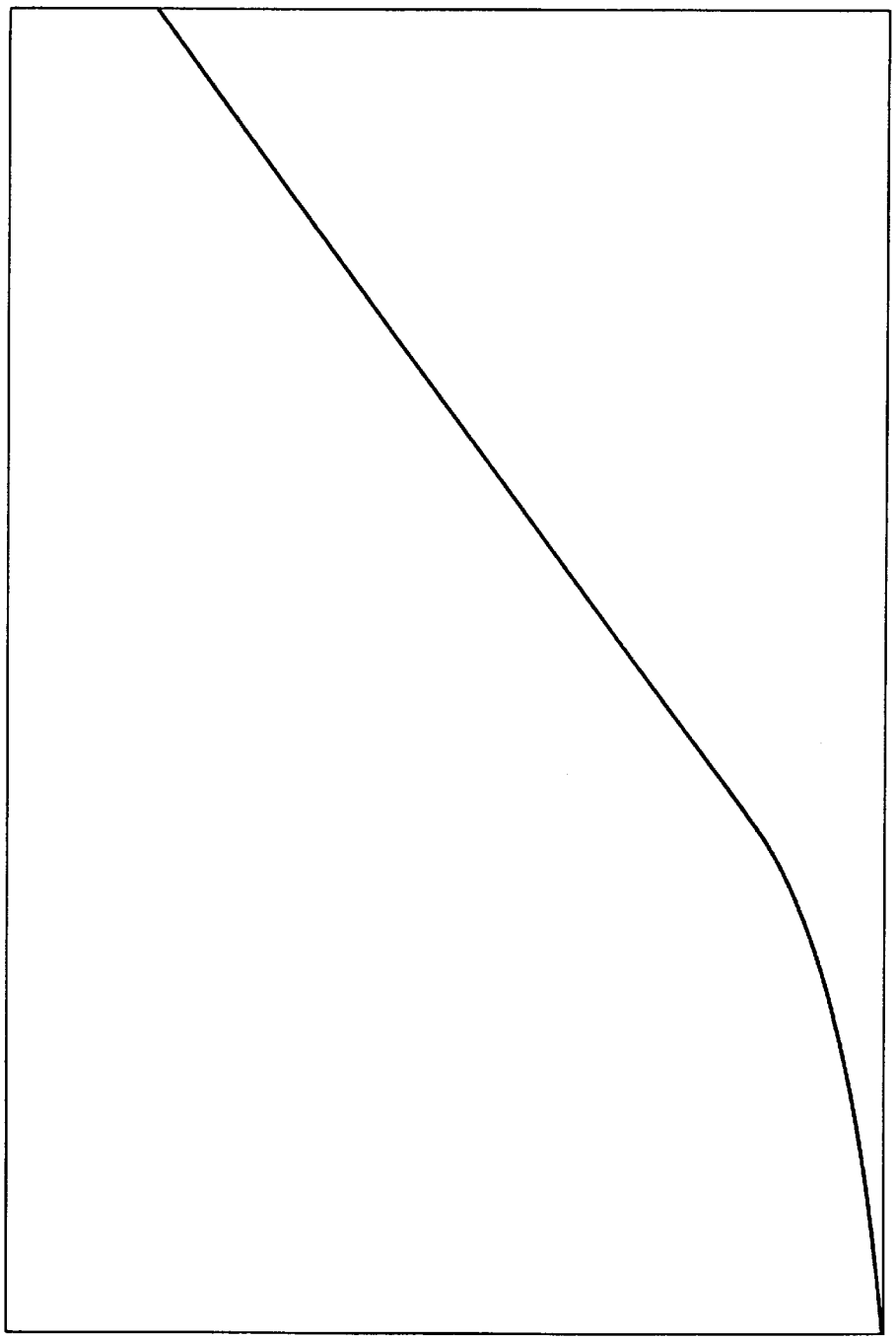

5,934,696

VARIABLE RATE ANTI-ROLL BAR END LINK

BACKGROUND OF THE INVENTION

1. Field of the Invention

The present invention relates generally to independent suspensions of vehicles and, more specifically, to a variable rate anti-roll bar link for connecting a control arm of such a suspension to an anti-roll bar.

2. Description of the Related Art

Independent suspension systems, those in which the suspension system provides a separate mounting for each wheel, often incorporate a linkage between the frame and the suspension system to control the action of the system and to overcome the tendency of car bodies to lean on corners. This linkage often is referred to as an anti-roll bar, a stabilizer bar, an anti-sway bar, or a sway bar. A short linkage connects the anti-roll bar to the suspension via a control arm. This component often is referred to as an end link.

A typical independent suspension is shown in FIG. 1. Suspension 10 comprises anti-roll bar 12 connected to lower control arms 14 via end links 16. This suspension further comprises upper control arms 18 and springs 20. The control arms in turn are mounted at one end to the vehicle frame (not shown), and at the other end are connected to wheels 22 via a connecting assembly. As the wheels travel up and down, the control arms pivot with respect to the frame. The end links transmit all or part of this movement to the anti-roll bar, which in turn is transmitted to the opposite end link to the control arm on the other side of the vehicle, to resist rolling of the vehicle.

FIG. 2 shows a conventional end link 30, which typically comprises hollow barrel portion 32 terminating in means for connecting to the control arm and anti-roll bar (not shown) such as threads. As shown, barrel portion 32 at each end comprises internal threads 34 into which the threaded portion 36 of a rod end may be inserted, and in turn connected to the respective control arm and anti-roll bar. This conventional link results in a linear rate spring characteristic, that is, the force applied to the anti-roll bar increases proportionally to the relative movement of the opposing control arms, as shown in FIG. 8. The rate of change of force applied to the anti-roll bar with respect to displacement of the opposing control arms is constant. In certain applications it is desirable to have a nonlinear progressive rate spring characteristic, that is, an end link in which the force applied to the anti-roll bar does not increase proportionally with respect to the relative movement of the opposing control arms, as shown in FIG. 9. There, the rate of change of force applied to the anti-roll bar with respect to the displacement of the opposing control arms increases as the relative displacement increases.

Accordingly, it is a principal object of the present invention to provide an end link that results in a progressive rate spring characteristic.

It is another object of the present invention to provide an end link with an adjustable spring characteristic.

SUMMARY OF THE INVENTION

In order to achieve the foregoing objections, the present invention provides an end link for connecting a stabilizer bar to a control arm that incorporates an internal resilient means, resulting in a progressive spring rate characteristic. The link is connected to the control arm and the anti-roll bar.

In one form of the present invention, the resilient member which in one form consists of a plurality of disk springs.

In another form of the present invention, the characteristics of the end link may be adjusted by varying the number and arrangement of the springs, which are removable.

Additional features and advantages of the present invention will become more fully apparent from a reading of the detailed description of the preferred embodiment and the accompanying drawings, in which like reference numerals refer to like parts and in which:

DESCRIPTION OF THE DRAWINGS

FIG. 4 is an exploded perspective view of the apparatus of the present invention;

FIG. 5 is a cross-sectional view of the apparatus of the present invention along line 5—5 of FIG. 4;

FIG. 6 is a cross-sectional view of the apparatus of the present invention taken along line 6—6 of FIG. 5;

FIG. 8 is a graph representing the progressive spring rate characteristics achieved with the variable rate end link of the present invention.

DETAILED DESCRIPTION OF THE INVENTION

Figure 1:
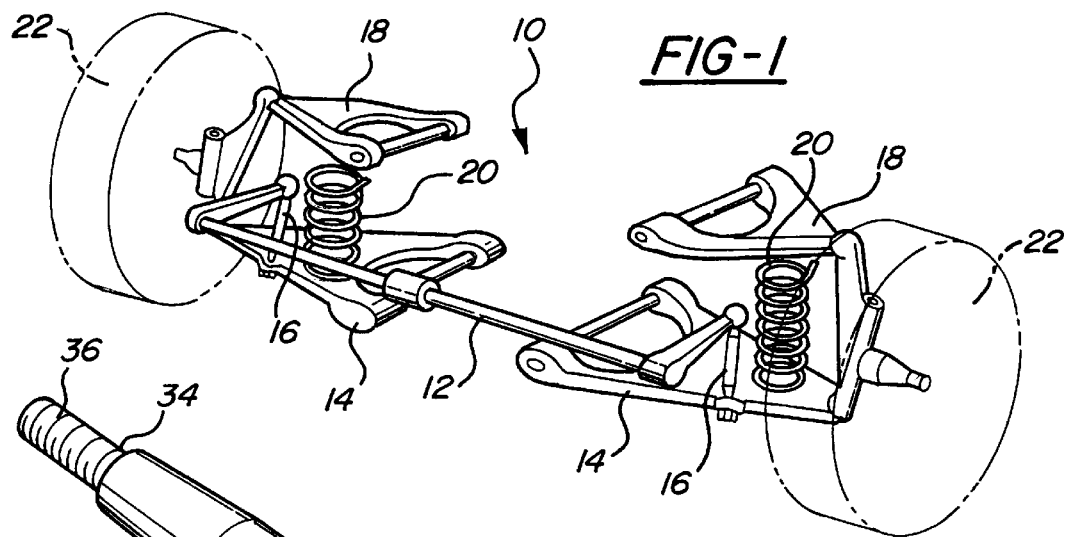
FIG. 1 is a partially-exploded perspective view of a typical conventional independent suspension.
Figure 2:
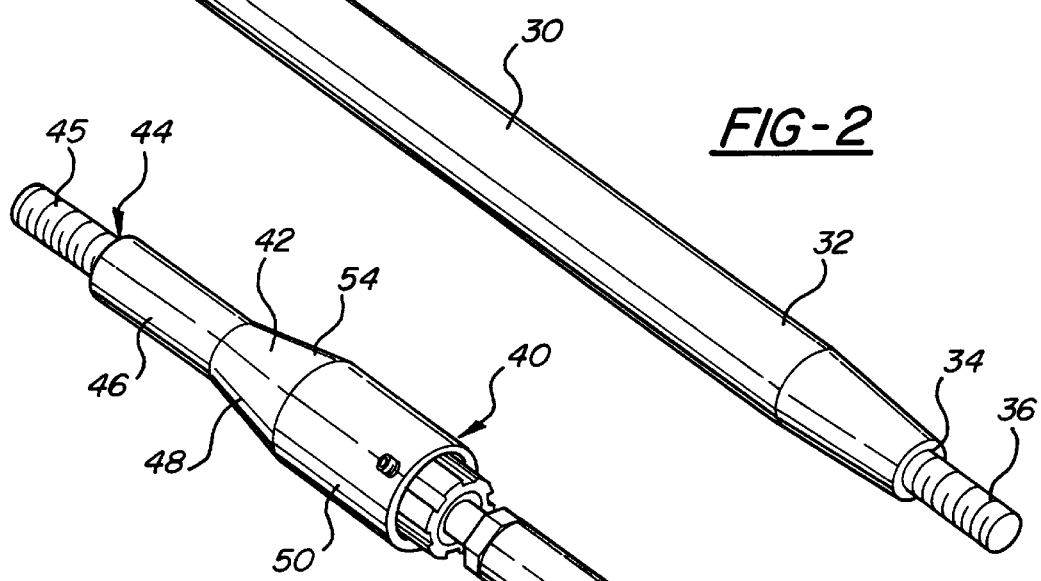
FIG. 2 is a perspective view of a conventional link.
Figure 3:
FIG. 3 is a perspective view of the apparatus of the present invention.
Figure 7:
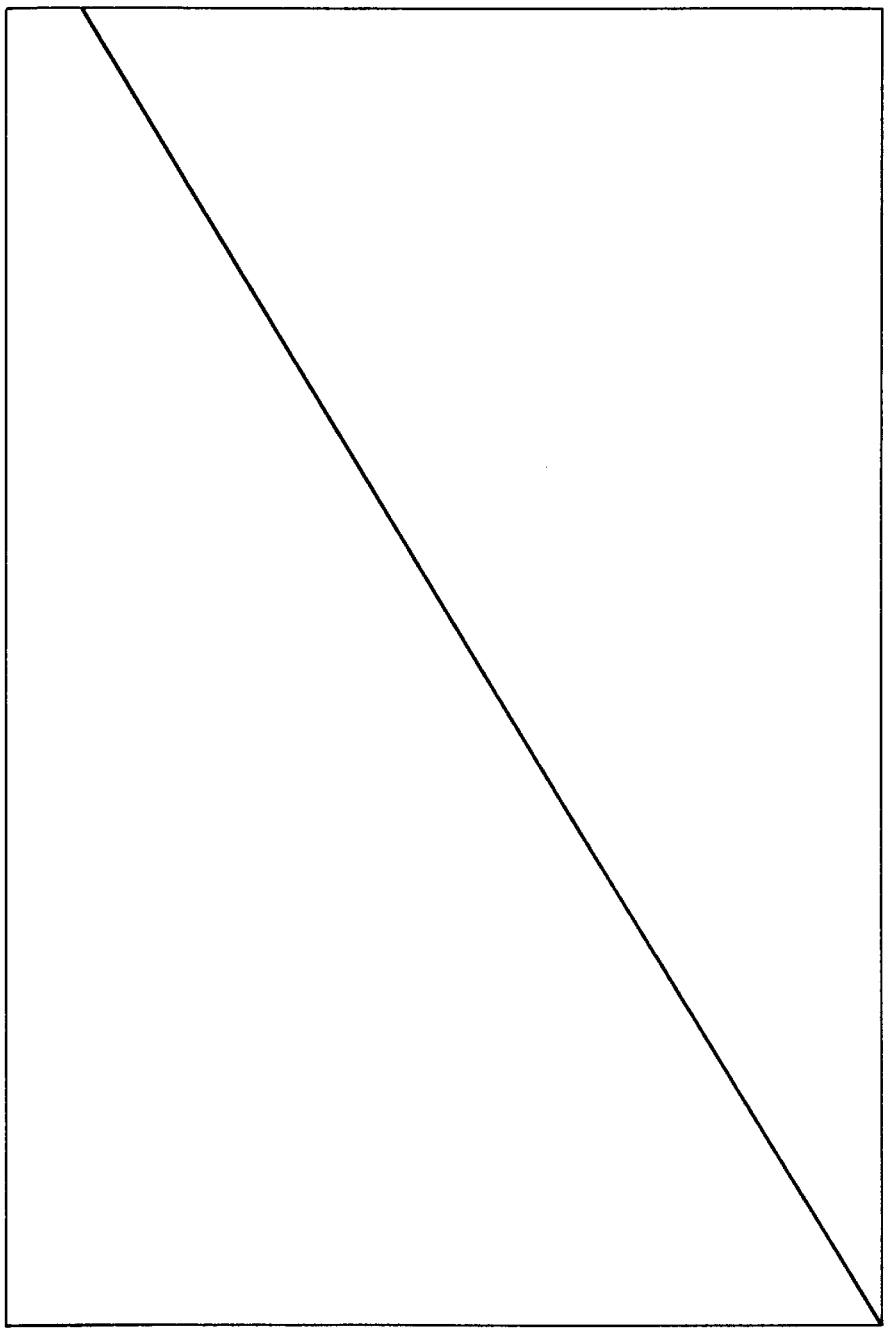
FIG. 7 is a graph representing the linear spring rate characteristic achieved with a conventional solid end link.

Turning to FIG. 3, FIG. 4 and FIG. 5, an end link according to the present invention is shown. Link 40 comprises lower link member 42 which further comprises internal threads 44 which receive external threads 45, which are part of the rod end that connects to the control arm. The lower link member further comprises lower portion 46, middle portion 48, and upper portion 50. The lower portion comprises a cylindrical member further comprising a threaded bore 52 with internal threads 44. The middle portion further comprises a frusto-conical member 54 defining cylindrical bore 56 which connects to bore 52. Upper portion 50 comprises a cylindrical member defining internally threaded cylindrical bore 58 connecting to bore 56. Bore 58 also defines threads 60. Upper portion 50 further defines set screw hole 62, which receives set screw 64.

The present invention further comprises resilient member 66 which in the preferred embodiment comprises a plurality of annular disk springs 68, which are assembled in a stack in various orientations. Any suitable resilient member may be used, however, such as a suitable elastomer. The use of a plurality of disk springs, such as those manufactured by Rolex Company National Disk Spring® Division, allows tuning of the spring characteristics, depending on the number, thickness, and orientation of the springs. In the preferred embodiment shown, the resilient member is removable.

The spring characteristic of the end link are determined by the characteristics of the resilient member 66. In this embodiment, the number of disk springs in the stack, their individual spring characteristics as determined by their shape and thickness, and their orientation, all contribute to the spring characteristic of the end link. In general, thin disk springs have a lower individual spring rate than thick disk springs. Stacking disk springs in series will lower the end link's spring rate, while increasing total available travel. Stacking pairs of disk springs of differing individual spring rates in series can result in a progressive end link spring rate.

As noted, in the preferred embodiment the resilient member in the form of a stack of springs is removable. This feature moreover allows an adjustability of the spring characteristic, which is done by disassembling the stack by removing set screw 64 and unscrewing bushing 78 from threaded bore 58, and by then changing the make up or orientation of the spring washers or otherwise varying the other resilient member. Springs 68 fit around lower shaft 72 of central link member 70 and are received by bore 58.

The present invention further consists of central link member 70 which has lower shaft 72, central portion 74, and upper shaft 76. The lower shaft fits into and is received by bore 56. Central portion 74 has generally the same diameter as disc springs 68 and abuts the stack of springs 68 as shown in FIG. 5. The spring stack is received by lower shaft 72. Upper shaft 76 connects to central portion 74, which is received by bore 58 such that central portion 74 abuts and holds in place the spring stack.

Cylindrical bushing 78 defines bore 80 which mounts on shaft 76. Bushing 78 further defines a plurality of exterior splines 82 and exterior threads 84. In the preferred embodiment the bushing comprises bronze, because of its good bearing properties. Bushing 78 screws into bore 58 via their respective threads, and is held in place via engagement of set screw 64 with splines. This is shown in detail in FIG. 6.

The present invention further consists of upper link member 86 which defines bore 90 which defines internal threads 92. Upper shaft 76 threadably engages with bore 90 and is secured with locking nut 88. The upper link member 86 is attached to a rod end, preferably by engagement with the internal threads in bore 90, which is attached to the anti-roll bar at its other end.

Upon assembly, the anti-roll bar connects through a rod end directly to upper link member 86, which is fastened directly to central link member 70. The lower control arm is connected through a rod end to lower link member 42 which is fastened directly to cylindrical bushing 78. The central portion 74 of central link member 70 is forced against bushing 78 by springs 68 when there is no external force applied to the end link. When force is applied to the end link, the central portion 74 of central link member 70 is separated from bushing 78 and compresses springs 68. Central link member 70 is held in axial alignment with lower member 42 sliding through bore 56 and with bushing 78 sliding through bore 80. The end link spring element, acting in series with the anti-roll bar, which is a torsional spring, combine to create a non-linear anti-roll bar spring characteristic as shown in FIG. 8.

The present invention has been described in an illustrative manner. It should be evidence that modifications may be made to specific embodiments described herein without departing from the spirit of the present invention. Such modifications are considered within the scope of the present invention, which is limited solely by the scope and spirit of the claimed invention.

We claim:

1. A link for connecting an anti-roll bar to a control arm of an independent suspension comprising:
   means for connecting to said control arm;
   means for connecting to said anti-roll bar;
   a lower link member, said means for connecting to said control arm connected to said lower link member;
   said lower link member comprising:
   a lower portion, a middle portion, and an upper portion;
      said lower portion comprising a cylindrical member further comprising a threaded bore for receiving said means for connecting to said lower control arm;
      said middle portion comprising a frusto-conical member defining a cylindrical bore, said bore connected to said lower portion bore, said lower portion connected to said middle portion;
      said upper portion comprising a cylindrical member defining an internally threaded cylindrical bore, said upper portion connected to said middle portion, said upper portion bore connected to said middle portion bore, said upper portion defining a set screw hole connected through to said upper portion bore;
   a resilient member comprising a plurality of annular disk springs, said springs received by said upper portion bore;
   a central link member, said central link member comprising a lower shaft, a central portion, and an upper shaft;
      said lower shaft sized to fit within and received by said upper portion bore of said lower member;
      said central portion connected to said lower shaft and having generally the same diameter as said springs;
      said upper shaft connected to said central portion, said central portion received by said upper bore of said lower member such that said central portion abuts said springs;
      said lower shaft received by said lower portion bore;
   a cylindrical bushing further comprising an upper portion and a lower portion, said lower portion comprising an externally threaded cylindrical member for engaging said internal threads of said upper portion bore, said lower portion further comprising a cylindrical bore for receiving said upper shaft of said central link member;
      said upper portion comprising a cylindrical member externally splined for receiving said set screw and further comprising a bore connected to said lower bore for receiving said upper shaft, said bushing mounted on said upper shaft.

2. The link of claim 1 further comprising a locknut, said locknut capable of securing said upper shaft to said upper link member.

3. The link of claim 1 further comprising an upper link member, said upper link member comprising an internally threaded hollow cylindrical member, said middle portion further comprising means for engaging said upper link member, said means comprising threads on said upper shaft.

4. A link for connecting an anti-roll bar to a control arm of an independent suspension comprising:
   a lower link member adapted to be connected to said control arm and including a resilient member;
   a central link member received by said lower link member; and
   an upper link member connected to said central link member and adapted to be connected to said anti-roll bar;
      said lower link member including a lower portion, a middle portion, and an upper portion, said lower portion having a threaded bore for receiving said lower control arm, said middle portion including a frusto-conical member defining a cylindrical bore connected to said lower portion bore, said upper portion defining an internally threaded cylindrical bore connected to said middle portion bore, said upper portion defining a set screw hole intersecting said upper portion bore.

5. The link for connecting an anti-roll bar to a control arm of an independent suspension of claim 4, wherein said lower link member includes a plurality of annular disk springs.

6. The link for connecting an anti-roll bar to a control arm of an independent suspension of claim 5, wherein said lower link member defines a bore and said plurality of annular disk springs is removably disposed in said bore.

7. The link for connecting an anti-roll bar to a control arm of an independent suspension of claim 5, wherein said annular disk springs of said plurality of annular disk springs are stacked in series;.

8. The link for connecting an anti-roll bar to a control arm of an independent suspension of claim 7, wherein said central link member includes a lower shaft passing through said plurality of annular disk springs.

9. A link for connecting an anti-roll bar to a control arm of an independent suspension comprising:

a lower link member adapted to be connected to said control arm, said lower link member defining a first bore portion and a second bore portion;

a plurality of annular disk springs disposed in said second bore portion;

a central link member received by said lower link member; and an upper link member connected to said central link member and adapted to be connected to said anti-roll bar;

said central link member including a lower shaft, a central portion, and an upper shaft, said lower shaft sized to fit within and be received by said second bore portion of said lower link member, said central portion having substantially the same diameter as said annular disk springs, said central portion received by said first bore portion of said lower member such that said central portion abuts said annular disk springs.

10. The link for connecting an anti-roll bar to a control arm of an independent suspension of claim 9, wherein said annular disk springs of said plurality of annular disk springs are stacked in series.

11. The link for connecting an anti-roll bar to a control arm of an independent suspension of claim 10, wherein said lower shaft of said central link member passes through said plurality of annular disk springs.

12. A link for connecting an anti-roll bar to a control arm of an independent suspension comprising:

a lower link member adapted to be connected to said control arm and a resilient member; a central link member received by said lower link member, said central link member including an externally threaded upper shaft; and an upper link member connected to said central link member and adapted to be connected to said anti-roll bar, said an upper link member including an internally threaded hollow cylindrical member, and a locknut securing said upper shaft to said upper link member.

13. The link for connecting an anti-roll bar to a control arm of an independent suspension of claim 12, wherein said lower link member includes a plurality of annular disk springs.

14. The link for connecting an anti-roll bar to a control arm of an independent suspension of claim 13, wherein said lower link member defines a bore and said plurality of annular disk springs is removably disposed in said bore.

15. The link for connecting an anti-roll bar to a control arm of an independent suspension of claim 12, wherein said annular disk springs of said plurality of annular disk springs are stacked in series.

16. The link for connecting an anti-roll bar to a control arm of an independent suspension of claim 15, wherein said central link member includes a lower shaft passing through said plurality of annular disk springs.

17. A link for connecting an anti-roll bar to a control arm of an independent suspension comprising:

a lower link member adapted to be connected to said control arm, said lower link member defining a first bore portion and a second bore portion;

a plurality of annular disk springs disposed in said second bore portion;

a central link member including a lower shaft passing through said plurality of annular disk springs and received in said first bore portion, said central link member further including a portion abutting an uppermost one of said plurality of annular disk springs; and an upper link member connected to said central link member and adapted to be connected to said anti-roll bar.

a central link member received by said lower link member, said central link member including an externally threaded upper shaft; and an upper link member connected to said central link member and adapted to be connected to said anti-roll bar, said an upper link member including an internally threaded hollow cylindrical member, and a locknut securing said upper shaft to said upper link member.

18. The link for connecting an anti-roll bar to a control arm of an independent suspension of claim 17, wherein said plurality of annular disk springs is removably disposed in said first bore.

19. The link for connecting an anti-roll bar to a control arm of an independent suspension of claim 17, wherein said annular disk springs of said plurality of annular disk springs are stacked in series.

20. The link for connecting an anti-roll bar to a control arm of an independent suspension of claim 17, wherein said central link member further includes an upper shaft threadably engaged with said upper link member.

* * * * *